INVENTOR.
Marvin Camras

BY Hill, Sherman, Meroni, Gross & Simpson ATTORNEYS

INVENTOR.
Marvin Camras

BY Hill, Sherman, Meroni, Gross & Simpson
ATTORNEYS

INVENTOR.
Marvin Camras

BY Hill, Sherman, Meroni, Gross & Simpson ATTORNEYS

United States Patent Office 3,449,528

Patented June 10, 1969

3,449,528

TWO SPEED TAPE TRANSPORT WITH INDEPENDENT AUDIO AND VIDEO MODES OF OPERATION

Marvin Camras, Glencoe, Ill., assignor to IIT Research Institute, Chicago, Ill., a corporation of Illinois Filed May 17, 1965, Ser. No. 456,192
Int. Cl. G11b 5/00, 15/28
U.S. Cl. 179—100.2 11 Claims

ABSTRACT OF THE DISCLOSURE

A longitudinal scan video and/or audio magnetic transducer apparatus with provision for head shifting, bulk demagnetization, automatic head cleaning by means of a revolving brush, and conversion between video transducing operation at a high transducing speed and audio transducing operation at a low transducing speed.

This invention relates to a transducer apparatus and particularly to a tape record transducer apparatus in which a tape record medium is transported past a transducer head at sufficiently high speed to accommodate recording and/or playback of video intelligence signals.

An object of the present invention is to provide a novel tape transducer arrangement which is uniquely simple and economical and yet which is capable of meeting the relatively critical requirements of a video signal transducing system.

Another object of the present invention is to provide a novel and improved capstan assembly for insuring against tape slippage.

Another object of the present invention is to provide a novel capstan assembly and transducer head configuration providing stable coupling of the head to the tape and relatively uniform motion across the head.

Another object of the present invention is to provide a novel and improved indexing means for relatively shifting the head and tape to place the head in spaced relation to successive channels of a tape record medium.

Another object of the present invention is to provide indexing means providing for automatic return of the head to an initial channel after scanning of a series of channels in succession.

Another object of the present invention is to provide a novel indexing means which provides for biasing the head against the tape in transducing condition thereof and retraction of the head prior to an indexing operation.

Another object of the present invention is to provide a novel bulk erase means for a tape transducer system.

Another object of the present invention is to provide an automatically cycled bulk erase means directly associated with an operating position of a tape reel on a tape transducer apparatus.

Another object of the present invention is to provide an interlock for preventing inadvertent bulk erase of the tape record medium.

Still another object of the present invention is to provide a bulk erase system wherein the intensity of an alternating erase magnetic field is gradually reduced to zero automatically to demagnetize a record medium in coil form.

A feature of the present invention relates to a channel indexing means whereby the transducer head becomes disengaged from the record medium during indexing of the transducer head to the next successive channel on the record medium.

A further feature of the present invention relates to a transducer apparatus which is capable of transporting a record medium selectively at high and low speeds for the recording and playback of either video or audio intelligence respectively.

Other objects and features which I believe to be characteristic of my invention are set forth with particularity in the appended claims. My invention itself, however, both as to its organization, manner of construction, and method of operation, together with further advantages and objects thereof, may best be understood by reference to the following description taken in conjunction with the accompanying drawings, in which:

Figures 1, 2, 3, 4, 5, 6:
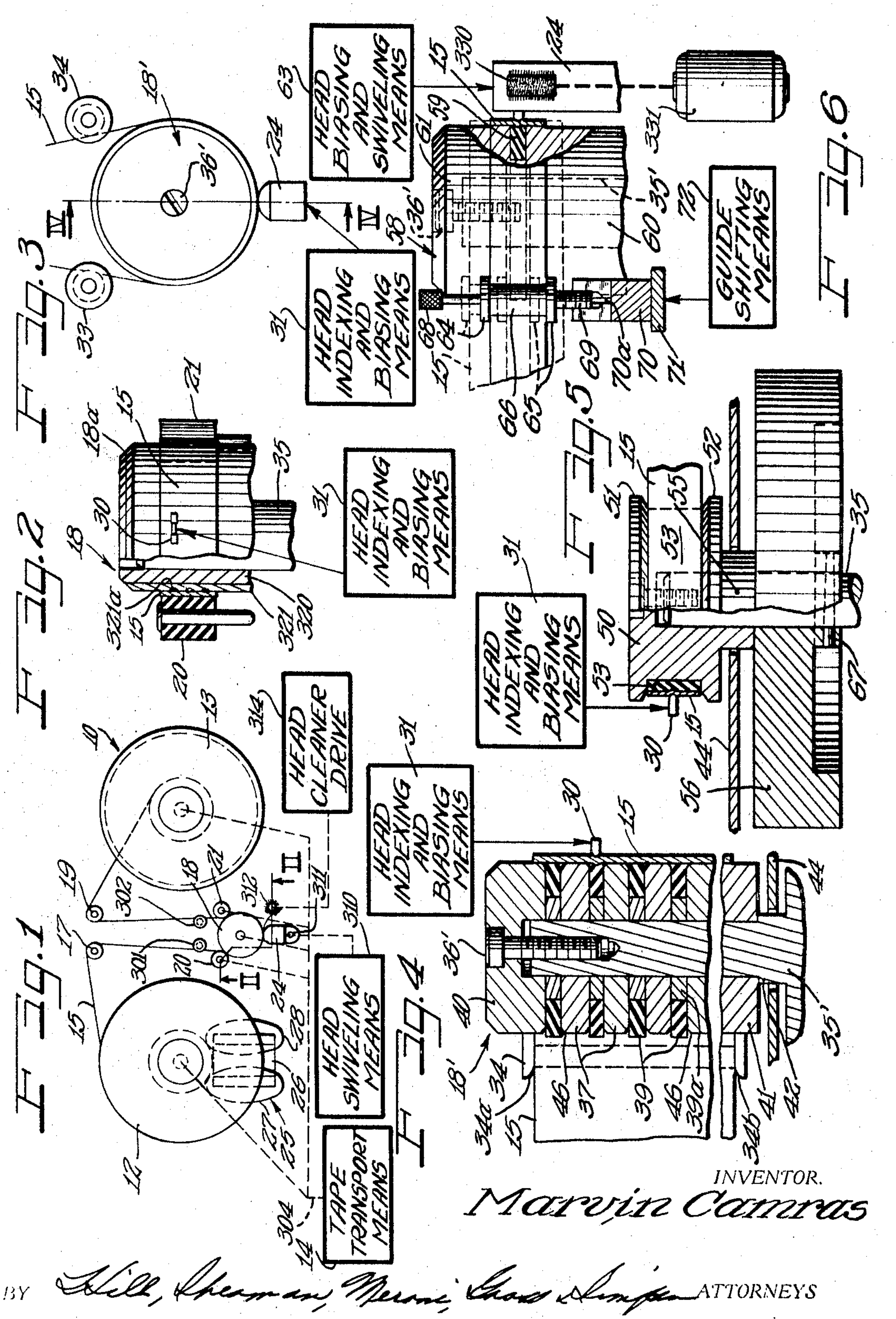
FIGURE 1 is a top plan view of a tape transducer apparatus in accordance with the present invention.
FIGURE 2 is a vertical sectional view taken along the line II—II of FIGURE 1.
FIGURE 3 is a top plan view showing a modified tape transducer apparatus.
FIGURE 4 is a vertical sectional view taken along the line IV—IV of FIGURE 3.
FIGURE 5 is a vertical sectional view showing a further modification of a tape transducer apparatus in accordance with the present invention.
FIGURE 6 is a side elevational view of a still further modification in accordance with the present invention, with certain parts broken away and in section.

Shown in FIGURE 1 is a portion of a tape transport system which is designated generally by reference numeral 10. A tape supply reel 12 and tape-up reel 13 are coupled to suitable tape transport means 14 which may be of any suitable type commonly known to those skilled in the art. A record medium 15 is shown having the major portion thereof wound about the reel 12 and an end portion threaded in the machine and connected to the reel 13. For purposes of explanation, the tape reel 12 will be referred to as the supply reel, and the tape reel 13 will be referred to as the take-up reel. However, it will be understood that the function of each reel is alternately changed during the scanning of successive channels on the record medium.

The record medium 15 extends from the supply reel 12 about a guide roller 17, a capstan 18 and a guide roller 19 and then to the take-up reel 13. A pair of friction faced pinch rollers 20 and 21 are biased aginst the capstan 18 in such a manner as to maintain the record medium 15 in firm contact with the capstan 18. The pinch rollers may be selectively retractible from the capstan to facilitate tape threading. Dash lines from the tape transport means 14 to the reels 12 and 13, the roller 20 and 21 and the capstan 18 indicate suitable coupling means to transport the record medium alternately in opposite directions during operation of the system. A transducer head 24 is placed in scanning relation with one or more channels on the record medium 15.

An electromagnet 25 is formed by a U-shaped core 26 which has wound about its leg portions a pair of coils 27 and 28. The electromagnet 25 is selectively energized by a source of alternating current for bulk erasure of the record medium as will be described in detail in connection with FIGURES 10 and 11.

Shown in FIGURE 2 is a sectional view taken along the line II—II of FIGURE 1. The record medium 15 is maintained in firm contact with the capstan drive 18 by means of the friction faced rollers 20 and 21. The magnetic head 24 has a pair of magnetic pole pieces 30 which are maintained in scanning relation with a given channel on the active surface of the record medium. The inactive surface of the record medium is in driven contact with the capstan 18. The magntic pole pieces 30 of head 24 are connected to a suitable head indexing and biasing means indicated by reference numeral 31. The head indexing and biasing means 31 provides resilient mechanical biasing of the head against the record medium during a transducing operation. In addition, the head indexing and biasing means 31 provides shifting apparatus for sequentially indexing the pole pieces 30 to successive channels on the record medium 15.

Shown in FIGURE 3 is an alternate embodiment of a tape guide means which can be used to guide the record medium past the transducer head 24 in a precise relation such that the transducer head 24 can scan a channel on the record medium. A pair of flanged guide rollers 33 and 34 are positioned sufficiently near a capstan 18′ so that the portion of the record medium 15 which is engaged with the capstan 18′ will be effectively guided by the flanges on the guide rollers 33 and 34. The guide rollers 33 and 34 may be either freely rotatable or stationary guides having highly polished guide surfaces. The capstan 18′ is secured to a drive shaft 35′, corresponding to shaft 35 shown in FIGURE 2, by means of a screw 36′, FIGURES 3 and 4.

Shown in FIGURE 4 is a detailed view of the capstan 18′ and guide roller 34 as taken along the line IV—IV of FIGURE 3. The capstan 18′ comprises a plurality of metal disks 38 and rubber disks 39 which are held in place on the shaft 35′ between a cap member 40 and a base member 41. The base member 41 is placed on the shaft 35′ and rests on an annular shoulder 42, which may be an integral part of the shaft 35′. The axial extent of the shoulder 42 is sufficient to prevent the bottom surface of the base member 41 from touching or rubbing the tape deck panel 44. The metal disks 38 and the rubber disks 39 are alternately placed on the shaft 35′ and fixedly held in place by the cap 40 which, in turn, is secured to the shaft 35′ by the screw 36′ as shown in FIGURE 4. The rubber disks 39 are preferably provided with non-resilient ring portions **39*a* radially inwardly thereof. The non-resilient ring portions 39*a* serve to prevent the rubber disks 39 from being excessively compressed by the cap 40. It will be understood that the disks 38 and 39 may be of other suitable relatively rigid and relatively resilient materials, respectively. Preferably the disks 38, ring portions 39*a*, cap 40 and base 41 may be of any material which is substantially rigid and, the disks 39** may be of any material which is substantially deflectable in response to the pressure exerted thereon by the tape in operation.

To provide a frictional contact surface for the record medium 15, the diameter of the rubber disks 39 in the uncompressed state is greater than the diameter of the metal disks 38. However, to maintain the effective diameter of the capstan 18′ constant so that the speed of the record medium is maintained constant, each metal disk 38 as well as the cap 40 and base 41 are provided with beveled edges 46. The grooves formed by the beveled edges 46 serve to receive the volume of rubber which is compressed by the record medium 15, thereby maintaining the diameter of the capstan 18′ equal to the diameter of the metal disks 38. Also, by way of example, the axial distance between successive rubber disks 39 center to center is equal to the center to center distance between successive channels on the record medium 15. The pole pieces 30 of the transducer head 24 will engage the record medium 15 at a portion thereof backed by one of the rubber disks 39 and will be biased thereagainst as shown in FIGURE 4. The edges of the flanges of the guide rollers 33 and 34 are preferably rounded or beveled as shown at **34*a* and 34*b***.

Shown in FIGURE 5 is an alternate embodiment which can be used to transport the record medium 15 past the transducer head 24 in the transducer apparatus 10 of FIGURE 1. The record medium 15 is driven by a capstan 50, which has a pair of annular flanges 51 and 52 spaced apart in an axial direction to receive the record medium 15 therebetween. In the preferred embodiment of the present invention, a resilient band 53 of friction material is placed about the capstan 50 and is carried between the flanges 51 and 52. The band 53 provides a frictional surface for contact with the record medium 15 for transport thereof. A reduced diameter portion 55 is provided on the capstan 50 and extends through the tape deck panel 44 and is abutted against a fly wheel 56 which is also secured to the shaft 35. The capstan 50 is secured to the shaft 35 by the screw 36. The fly wheel 56 is secured to the shaft 35 by a tapered pin 67.

Shown in FIGURE 6 is an alternate embodiment of a capstan and an alternate method of shifting and guiding the record medium 15 past the transducer head 24 in precise relation therewith. A capstan 58 has a disk 59 of resilient friction material which is in driving engagement with the record medium 15. The axial extent of the disk 59 is arranged so that a portion of the non-magnetic surface of the medium 15 will be in contact with the disk 59 at all times during operation.

By way of example of an alternative construction, the capstan 58 can be constructed in substantially the same manner as the capstan drive 18′ of FIGURE 4. A lower portion 60 of the capstan 58 is placed on a shaft 35′, and engages an annular shoulder (not shown) on the shaft in a manner similar to that shown in FIGURE 1. The disk 59 is then placed on the shaft 35′ together with an inner washer (not shown) similar to washer **39*a* in FIGURE 4. An upper portion 61 of the capstan 58 is placed on the shaft 35′ and secured thereto by a screw 36′. The screw 36′ would then maintain the portions 60 and 61 and the disk 59 in a fixed position on the shaft 35′. The capstan 58 may be provided with an annular groove for receiving a resilient ring which is stretched over the major diameter of the capstan 58** to be placed in the groove, as actually shown in FIGURE 6, however.

The transducer head 24 has connected thereto a suitable head biasing means 63 for supplying a resilient mechanical bias to urge the transducer head 24 against the tape 15 during transducing operation. The record medium 15 passes between a pair of annular flanges 64 and 65 of a shiftable guide 66. To accurately align the channels on the record medium 15 with respect to the transducer head 24, an adjusting knob 68 is fixedly sceured to the guide 66 and a threaded shaft portion 69 of the guide roller 66 is threaded into a collet 70. The collet 70 preferably has slots such as **70*a* dividing the end thereof into four equal segments which have a slight amount of resiliency so as to clamp the threaded portion 69 and hold it in a fixed angular position within the collet except as the knob 68 is manually rotated to adjust the vertical position of guide 66 relative to the collet 70. The collet 70 is secured to a mounting bar 71 which, in turn, is connected to a suitable guide shifting means 72. It will be understood that the guide shifting means 72 is connected to a similar adjustable guide and collet which cannot be seen in FIGURE 6, but which is located behind the guide 66 and collet 70**. The two guide assemblies of FIGURE 6 may be arranged relative to the capstan 58 as shown in FIGURE 3 for guides 33 and 34 and capstan 18.

Figures 7, 8, 9:
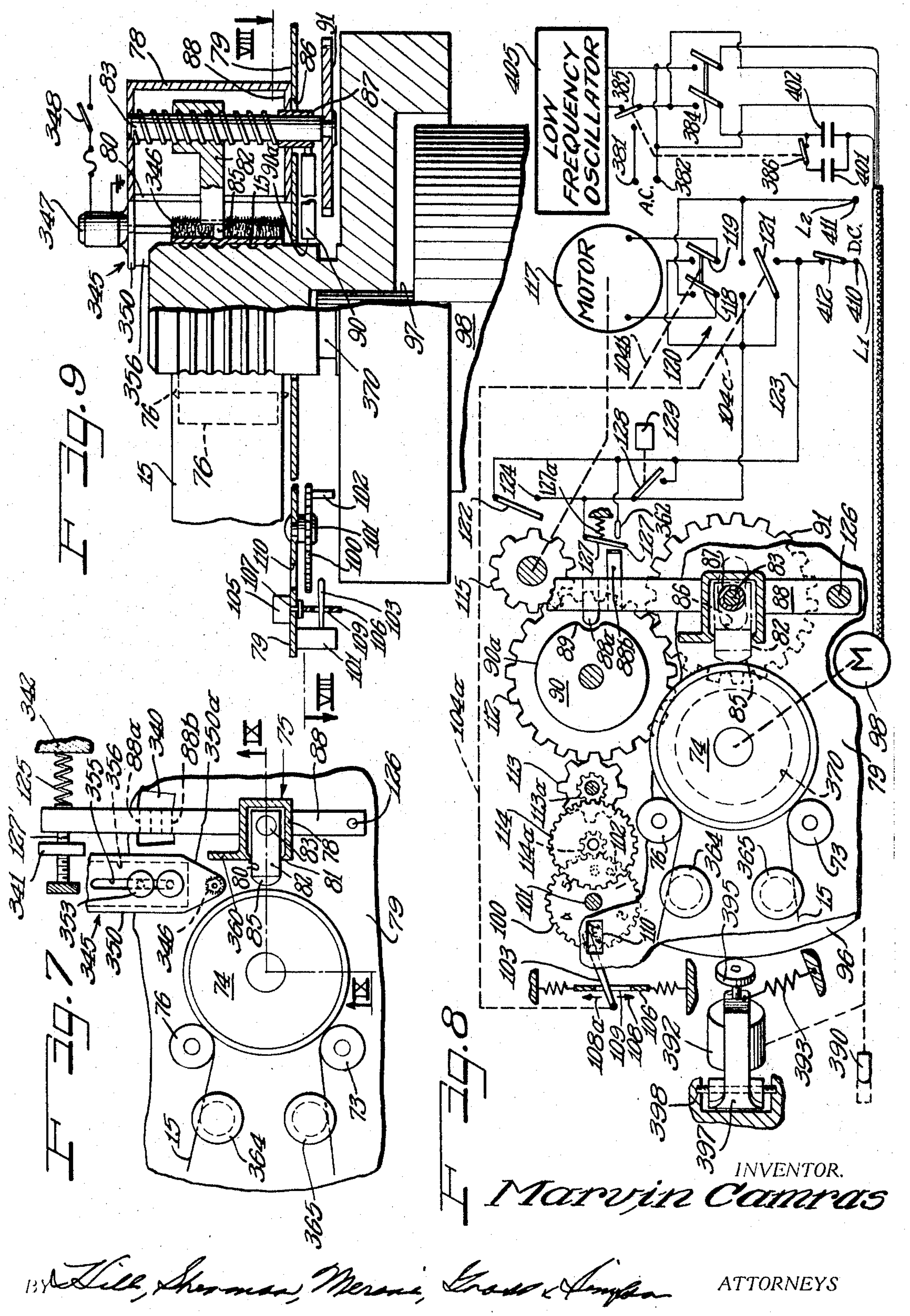
FIGURE 7 is a top plan view of yet another form of tape transducer apparatus in accordance with the present invention.
FIGURE 8 is a somewhat diagrammatic plan view of the apparatus of FIGURE 7, with a top panel of the apparatus broken away to show certain interior parts, and with an electric circuit shown in association with the said parts.
FIGURE 9 is a vertical sectional view taken along the line IX—IX of FIGURE 8.

As shown in FIGURE 7, the record medium 15 passes between a pinch roller 73 and a capstan 74 and past the transducer head assembly 75. After the record medium 15 passes the transducer head assembly 75, it passes between the capstan 74 and a pinch roller 76. The pinch rollers 73 and 76 are biased against the capstan 74 in such a manner as to maintain the portion of the record medium which is wrapped about the capstan drive in firm contact therewith.

The transducer head assembly 75 has a U-shaped guide bracket 78 which is fixedly secured to a tape deck panel 79. The extreme ends of the leg portions of the bracket 78 are inwardly turned to form a pair of guide rails 80 and 81. A portion of a transducer head mounting block 82 is carried within the U-shaped bracket 78 and is in slidable engagement with the guide rails 80 and 81. A threaded shaft 83 passes through a threaded portion of the transducer head mounting block 82 for purposes of vertically shifting the mounting block within the bracket 78 upon rotation of the shaft 83. By way of example, the pitch of the threads on the shaft 83 may be substantially equal to the distance between channels on the record medium so that one complete rotation of the shaft 83 will cause the mounting block 82 to be advanced precisely to a position in alignment with the next successive channel on the record medium.

A transducer head 85 is maintained in contact with the record medium 15 during the scanning of a given channel on the record medium. However, prior to the positioning of the transducer head 85 at the next successive channel on the record medium, the mounting block 82 is shifted within the U-shaped bracket 78 a sufficient amount to completely disengage the transducer head 85 from the surface of the record medium.

FIGURE 9 is a detailed view of the transport apparatus shown in FIGURE 7. The portion of the record medium 15 and the pinch roller 73 which would be seen in the foreground of FIGURE 9 are omitted for purposes of clarity.

As shown in FIGURE 9, the threaded shaft 83 extends through an opening 86 in the tape deck panel 79. The opening 86 is sufficiently large to permit lateral movement of the shaft 83 in the direction to disengage the transducer head 85 from the record medium 15. The shaft 83 is journaled within a bearing 87 which is carried by a lever arm 88. A portion **88*a* of the lever arm 88 is shown registered with a notch 89 of a cam 90. As the cam 90 rotates about its central axis, the portion 88*a* of lever 88 will ride out of the notch and engage the face 90*a* of the cam to disengage the transducer head 85 from the record medium. During the time the cam 90 is rotating, a gear 91, which is secured to the shaft 83, is also rotated, thereby advancing the transducer head 85** to the next channel on the record medium.

The capstan 74 is provided with a plurality of recesses or grooves 94 with lands 95 between adjacent grooves 94. In the preferred embodiment of the present invention, the width of the grooves 94 is slightly greater than the thickness of the transducer head 85, as shown in FIGURE 9. Also, the center-to-center distance between the grooves 94 is equal to the center-to-center distance between the channels on the record medium. When the transducer head 85 is in scanning relation with the record medium 15, the record medium will be indented into the groove 94 as shown in FIGURE 9.

A fly wheel 96 is an integral part of the capstan 74 and is secured to an output shaft 97 of a motor 98. The distance between the tape deck panel 79 and the upper portion of the fly wheel 96, as shown in FIGURE 9, is sufficient to accommodate the gearing necessary to operate the transducer head assembly 75.

A circular indicator 100 is rotatably carried by the tape deck panel 79 by means of a rivet 101, FIGURE 9. The peripheral surface of the indicator 100 is cut to form a gear which is engaged with a suitable gear train which, in turn, is engaged with the gear 91. The ratio of the gear train between the gear 91 and the indicator 100 is such that one revolution of the gear 91 will rotate the indicator 100 a fraction of a revolution, and the reduction ratio is proportional to the number of channels on the record medium. If there are six channels, the gear reduction may be 6:1.

A pin 102 is secured near the outer periphery of the indicator 100 and may be located between the numerals indicating the first and last channels on the record medium. When the last channel on the record medium has been played, the drive system will begin to advance the transducer head 85. This will cause the pin 102 on the indicator 100 to advance sufficiently to actuate a lever 103, FIGURE 9, of a reversing switch assembly 104. This action will cause a reversible drive motor 117 to be energized for rotation in the opposite direction thereby repositioning the transducer head 85 to a position in registry with the first channel on the record medium. A slidable tab 105 has a portion 106 extending through an opening 107 in the tape deck panel 79. The portion 106 is provided with an opening 109 which is sufficiently large to allow the lever 103 to move between its two positions without moving the tab 105 when the tab is in an initial position. However, the opening 107 in the tape deck panel 79 is large enough to allow the tab 105 to be shifted in a direction 108, FIGURE 8, along the surface of panel 79 from its initial position to a reversing position to shift the lever 103 to reversing position. The tab 105 may also be shifted in the opposite direction indicated by arrow **108*a*, FIGURE 8, from its initial position to shift lever 103** from its reversing position to its forward position.

As shown in FIGURE 8, the gear 91 and indicator 100 are connected by a gear train consisting of gears 112, 113 and 114. A viewing window 110 is provided in the tape deck 79 so that the user can see what channel on the record medium is being used at a given instant. Connected to the gear 112, and on the same axis therewith, is the cam 90, the surface **90*a* of which is engaged with the lever portion 88*a* during the time when the transducer head 85 is being indexed to the next channel on the record medium. The gear 113 has a smaller gear 113*a* which is in driving engagement with the gear 114. Similarly, the gear 114 has a smaller gear 114*a* which is in driving engagement with the gear portion of the indicator 100**.

Connected to the gear 112 is a main driving gear 115 which drives the entire gear train. The gear 115 is connected to the drive motor 117 so as to be driven thereby.

The motor 117 is connected in circuit with a pair of contractors 118 and 119 which are ganged together and form a part of a reversing switch 120. A contractor 121, which is also a part of the reversing switch 120, is provided to control delivery of power to the motor 117 when the motor is energized for rotation in the reverse direction. The motor 117 receives power from lines L1 and L2. The line L1 is connected to the motor 117 through the reversing switch 120, and is connected to a contractor 122 through a line 123. During the operation of the transducer apparatus shown in FIGURE 8, as the record medium 15 reaches its end of travel, irrespective of the direction thereof, the contractor 122 is automatically or manually actuated to engage a contact 124 for a sufficient period of time to allow contact 127 to be closed. Closure of contact 127 will cause the line L1 to be connected to the reversing switch 120 and the motor will be energized to position the transducer head 85 as mentioned hereinabove. It will be understood that during the time interval when the transducer head 85 is being indexed to the next channel on the record medium, the tape transport means is stopped and made ready for travel in an opposite direction.

When the motor 117 is energized for rotation in the forward direction, the cam face **90*a* will engage the lever member 88*a* and pivot the lever 88 about a pin 126. The lever 88 is biased by compression spring 125 in such a manner as to urge the member 88a against the cam face 90a. The mounting block 82, the shaft 83 and the gear 91, which are all connected to the lever 88, are also moved about the pin 126, thereby disengaging the transducer head 85 from the surface of the record medium 15. The teeth on the gears 91 and 112 are of such configuration that they remain in meshing engagement when the lever 88** is shifted.

A tab 88b on the lever 88 will actuate a switch contact 127 which is connected in parallel with the switch contact 122. A compression spring, indicated at 127a, urges contact 127 toward its open position. The motor 117 will drive the gear 115 until the lever member 88a again registers with the notch 89 at which time spring 127a returns contact 127 to open condition. An adjustable stop 127' is provided to engage the lever 88 to limit the movement of the transducer head 85 connected thereto. The pressure which the transducer head 85 exerts against the record medium 15 can be changed by adjusting the position of the stop 127' relative to the lever 88. A switch 128, which is connected in parallel with the switch 127 and the contactor 122, is actuated by means of a button 129. The switch 128 is provided for manually initiating the indexing of the transducer head between channels on the record medium.

As mentioned hereinabove, after the last channel on the record medium has been scanned by the transducer head 85, the pin 102 will actuate the lever 103 of the switch assembly 104 as shown in FIGURES 8 and 9. The switch assembly 104 includes the reversing switch 120 of FIGURE 8 so that the reversing switch contacts 118 and 119 will be actuated in response to the actuation of layer 103. This is indicated by dash lines 104a and 104b in FIGURE 8. Also, the contactor 121 is actuated as indicated by dash lines 104a and 104c in FIGURE 8 and applies power from line L1 to reversely energize the motor 117. As the transducer head 85 moves into alignment with the first channel on the record medium 15, the pin 102 will again actuate the lever 103 thereby placing the reversing switch 120 again in the forward direction. Should there be a slight overtravel in the positioning if the transducer head 85, the switch 127 will be actuated closed by the cam 90. This will cause the motor to advance the transducer head 85 until the lever portion 88a registers with the notch 89 of the cam 90 thereby stopping the motor 117 with the transducer head accurately positioned.

Figures 10, 11, 12, 13:
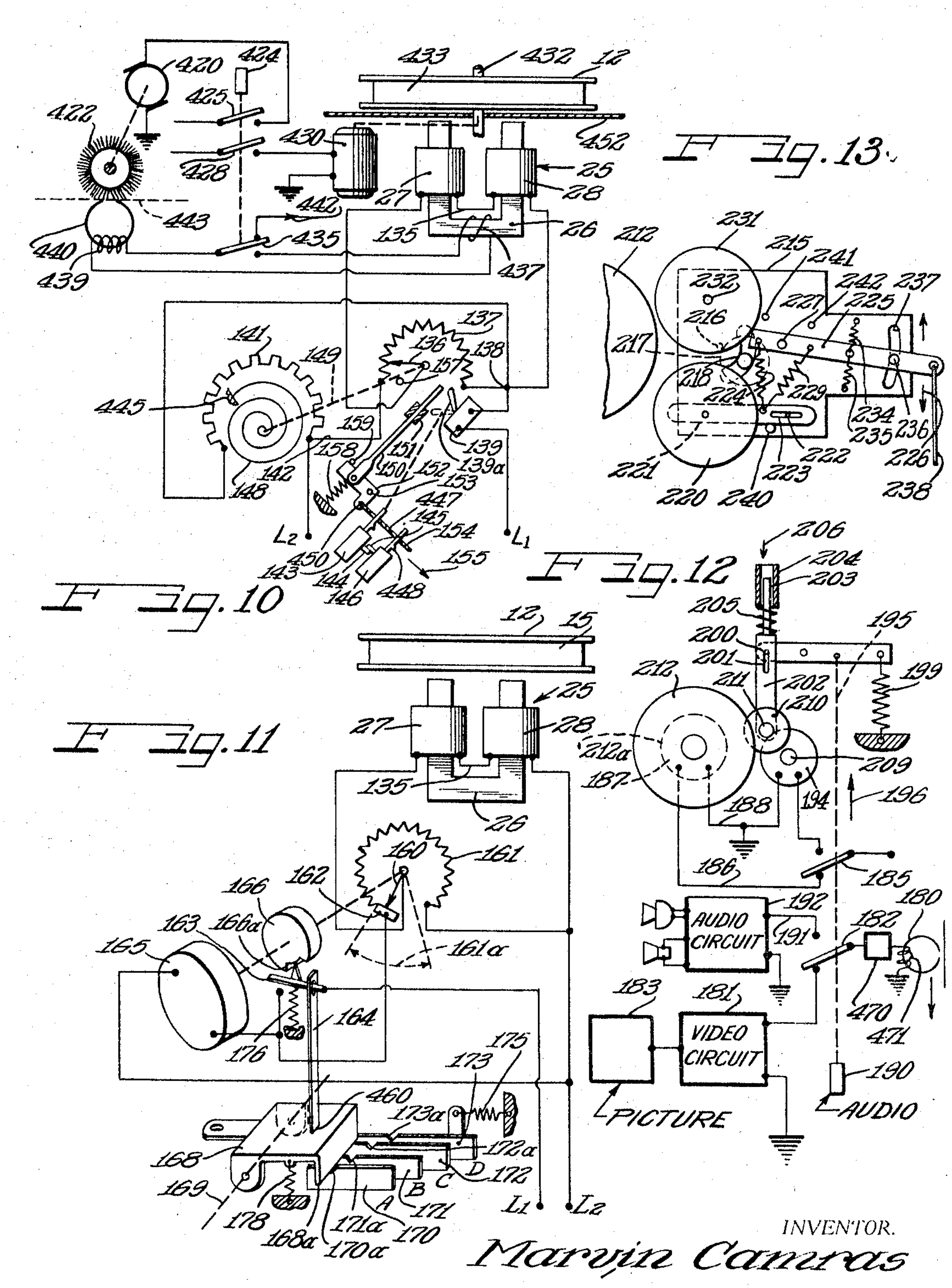
FIGURE 10 is a somewhat diagrammatic view illustrating an electric circuit for association with the bulk erase electromagnet of FIGURE 1.
FIGURE 11 is a somewhat diagrammatic view showing a modification of the bulk erase system of FIGURE 10.
FIGURE 12 is schematic diagram of a low and high speed tape transport system which can be used alternatively for audio and video transducing operations.
FIGURE 13 is a diagrammatic partial top plan view of a reversible drive apparatus which may be utilized in conjunction with any of the preceding embodiments.

Shown in FIGURE 10 is a schematic representation of the bulk demagnetization system which is used in the transducer apparatus 10 of FIGURE 1. Respective first terminals of coils 27 and 28 are connected electrically by lead 135. A second terminal of coil 27 is connected to a movable contact 136 of a potentiometer 137. The second terminal of coil 28 is connected to a circuit point 138 which, in turn, is connected to the line L1 through a switch 139. Also connected to the circuit point 138 is one terminal of the potentiometer 137 as well as one terminal of a heater element 141. The line L2 is connected to the other terminal of the heating element 141 and to the other terminal of the potentiometer 137 through a lead 142.

To energize the demagnetization system of FIGURE 10, a button 143, which is connected to the lever 139a of the switch 139, is manually depressed thereby shifting the lever 139a to the position shown. This action will close the contacts of switch 139 and apply power from the line L1 to circuit point 138. At this time the potentiometer 137 has developed thereacross the entire voltage between the lines L1 and L2. The button 143 is provided with an extension 144 which engages an extension 145 of a button 146. The button 146 is used to energize the necessary circuitry to place the tape transport in the forward mode of operation. In this mode, the brakes are released and capstan 18 and reel 13 are driven in a forward direction to begin winding the tape on reel 13, and thus causing rotation of reel 12 to expose successive segments of the coiled record medium to the demagnetizing field. When the button 143 is manually actuated, the heating element 141 is connected across the lines L1 and L2. As the heating element 141 is heated, a bimetallic spring 148, which is in close proximity with the heating element 141, begins to constrict by virtue of the differences in rate of expansion of the two metals of the spring. The center of the spring 148 is connected to the movable contact 136 as indicated by dash line 149 and will cause the contact 136 to be rotated in a clockwise direction as the spring 148 is heated. This action will cause the voltage applied to the coils 27 and 28 to be continuously decreased during the demagnetization operation.

When the contact 136 has reached the extreme end of travel on the potentiometer 137, the contact arm 136 will engage a push rod 150 which is slidably carried in a bushing 151. Movement of the push rod 150 will cause a lever 152 to be pivoted about a point 153 thereby sliding a latch bar 154 in the direction indicated by arrow 155 to release the buttons 143 and 146 to their off position to stop the rotation of reel 12. Thereafter the arm 136 will actuate lever 139a to open the contacts of switch 139. As the bimetal spring 148 cools, it will rotate the contact arm 136 in the counterclockwise direction until it engages a stop 157. The push rod 150 is returned to its initial position as determined by a stop pin 149 by means of a spring 158.

Shown in FIGURE 11 is a schematic representation of an alternate embodiment of a bulk demagnetization system. The coil 28 is connected to the line L1 while the coil 27 is connected to a movable contact arm 160 of a potentiometer 161. A stationary contact portion 162 of the potentiometer 161 is connected to the line L1 through a switch 163 and has substantially zero resistance over the arcuate extent thereof. The other lead of the potentiometer 161 is connected to the line L2. The movable contact arm 160 is mechanically coupled to a motor 165 so as to be driven thereby. Also connected to the motor 165 is a cam 166 which engages the switch 163 and maintains the switch closed during rotation thereof over a predetermined arc.

To energize the demagnetization system of FIGURE 11, a button on slide bar 173 is manually depressed thereby allowing a body portion 168 to pivot clockwise about an axis 169. A link, which is represented diagrammatically at 164 is connected between the body portion 168 and the switch 163 and is capable of actuating the switch 163 to closed condition. The body portion 168 must be registered with notches in a pluarilty of slide bars 170, 171, 172 and 173 in order to be actuated. By way of example, the slide bar 173 is biased by a tension spring 175 and will automatically shift link 164 to its initial position when the slide bar 173 is returned to its normal position shown in FIGURE 11. In the preferred embodiment of the present invention, the rod 173 will automatically energize the necessary circuitry to rotate the reel 12 in the forward direction when the demagnetization button coupled with slide bar 173 is manually depressed and the other slide bars have their notches registered with the edge 168a.

When the switch 163 is closed, power is applied to the potentiometer 161 and to the motor 165. The voltage developed across the potentiometer 161 is delivered to the coils 27 and 28. The contact arm 160 is rotated in a clockwise direction, as seen in FIGURE 11, by the motor 165 thereby continuously decreasing the voltage delivered to the coils 27 and 28 until the voltage is zero. As the motor 165 is rotating the contact arm 160, the cam 166 will maintain the switch 163 closed against the action of a compression spring 176. However, when the switch 163 registers with the cam notch 166a, the switch 163 will be opened thereby removing the power from the motor 165 and the potentiometer 161. The potentiometer 161 is preferably of the type which is continuously rotatable in a given direction, and has a region wherein the contact arm 160 does not engage the resistance element of the potentiometer 161. Also, the notch 166*a* is arranged in such a manner that the switch 163 will be opened as the contact 160 is moved into the region of disengagement of contact arm 160. The arc length of the notch 166*a* is preferably aligned with the arcuate segment of the potentiometer 161 indicated by reference numeral 161*a*. Preferably the operating parameters are such that the motor stops after each cycle with arm 160 in engagement with contact segment 162.

Shown in FIGURE 12 is a two-speed tape transport which can be used to move the record medium 15 at a a relatively high speed during recording or playback of video intelligence, and which can be used to move the record medium at a relatively low speed during recording and playback of audio intelligence. During high speed operation of the system, a transducer head 180 is connected to a video circuit 181 by a selector switch 182. The video circuit 181 is connected to a picture reproducing device 183 for receiving video intelligence during record operation, and for delivering video intelligence during playback operation. A switch 185 delivers power through a line 186 to one terminal of a high speed capstan motor 187. The other terminal of the capstan motor 187 is grounded through a line 188.

To place the system of FIGURE 12 in operation for recording and/or playback of audio intelligence, a button 190 is manually actuated thereby shifting the position of the switches 182 and 185. The switch 182 will then make contact with a line 191 which is connected to an audio circuit 192. Similarly, the switch 185 now makes contact with a low speed drive motor 194 to energize the motor. The button 190 is also connected to a rod indicated at 195 and is moved therewith. As the rod 195 is moved in the direction indicated by the arrow 196, a pivotally mounted lever 197 will pivot about a pin 198 in a counterclockwise direction against the force of a tension spring 199. This will cause a pin 200, which is secured to the lever 197, to move within an elongated slot 201 on a rod 202. The rod 202 has a reduced portion 203 which is slidably carried within a housing 204 and guided thereby. A compression spring 205 will thus move the rod 202 in the direction indicated by arrow 206 and cause a friction feed idler wheel portion 210 to engage drive shaft 209, and to cause a reduced diameter idler wheel portion 211 to engage the fly wheel 212. When the system of FIGURE 12 is placed in operation for recording or playback of video intelligence, the audio button 190 is unlatched to allow return of rod 195 to its initial position. The pin 200 will move to the end of the slot 201 and then retract the idler wheel 210 from engagement with the cooperating parts. The capstan motor 187 is provided with suitable reversing means for reversing the direction of the record medium during the scanning of successive channels thereon during video operation.

Shown in FIGURE 13 is a reversible drive system which can be used to drive the flywheel 212 of FIGURE 12 during audio operation. A plate 215 is pivotally mounted on a stationary portion of the transducer apparatus by a pin 216. A drive motor 217 has its output shaft extending through an opening 215*a* in plate 215 and carrying a friction faced drive wheel 218. An idler wheel 220 is connected to a movable arm 221 which is arranged for movement about a pin 222. The arm 221 will pivot about the pin 222 as well as move laterally with respect to the pin by virtue of an elongated opening 223 in the arm 221. When a lever 225 is moved in the direction indicated by arrow 226, the arm 221, which is connected to the lever 225 by a tension spring 224, is moved in such a manner as to bring the idler wheel 220 into contact with both the drive wheel 218 and the capstan flywheel 212 to drive capstan 212*a* (FIGURE 12) in one direction at an audio transducing speed. The rotational movement of the drive wheel 218 will be transmitted through the idler wheel 220 to rotate the capstan 212*a* in the forward direction.

The lever 225 is pivotally mounted to the plate 215 by a pin 227. A second spring 229 is connected between the levers 221 and 225, and is used to shift the idler wheel 220 in engagement with the drive wheel 218 when the lever 225 is moved in the direction indicated by arrow 230. In this instance, the rotational movement of the drive wheel 218 will be transmitted through the idler wheel 220 and an idler wheel 231 to rotate the capstan 212*a* in the reverse direction. The idler wheel 231 is rotatably connected to the plate 215 by a pin 232. A pair of opposing tension springs 234 and 235 are connected to the lever 225 for resiliently holding the lever 225 in a neutral position. The lever 225 has a pin 236 which extends into an arcuate slot 237 in the plate 215. A control rod 238 is connected to the lever 225 for shifting the lever in one or the other direction indicated by the arrows 226 and 230. When the lever 225 is urged in the direction 230, the pin 236 will move in the slot 237 until it engages the end of the slot and thereafter the pin 236 will pivot the plate 215 about the point 216. This action will cause the idler wheel 231 to come in contact with the capstan flywheel 212 and the idler wheel 220 to come in contact with both the drive wheel 218 and the idler wheel 231 to drive the capstan in the reverse direction at audio transducing speed. When the lever 225 is urged in the direction 226, the pin 236 will engage the other end of the slot 237 and again pivot the plate 215 about the point 216, and, as mentioned hereinabove, rotate the capstan 212*a* (FIGURE 12) in the forward direction.

A stop 240 is provided to limit the movement of the lever arm 221 when the reversible drive system of FIGURE 13 is in the neutral position as shown. It can be seen therefore that the reversible drive system of FIGURE 13 provides means for completely disengaging the drive surfaces of the drive wheel 218, idler wheels 220 and 231 and the capstan flywheel 212 when the system is in the neutral position. The motor 217 may be a low cost single direction shaded pole type which is electrically switched off when the selector lever 225 is in neutral position. In this condition the capstan flywheel 212 may be driven at high speeds for video.

Referring to FIGURE 1, flanged guide posts 301 and 302 are illustrated which may be similar to configuration to the guide posts 33 and 34 and serve to maintain the path of the tape record medium 15 about the capstan 18. The pressure rollers 20 and 21 may have an axial extent slightly less than the width of the tape 15 as illustrated in FIGURE 2. The pinch roll configuration of FIGURE 2 is applicable to a single pressure roller system such as illustrated in the eighth figure of my copending application Ser. No. 401,832 filed Oct. 6, 1964 and the disclosure of said copending application is incorporated herein in its entirety as a further illustration of the system of FIGURE 2. In this system, the transducer head is not associated with the capstan. The spring motor driven head indexing system of said copending application is specifically incorporated herein as an embodiment of the head indexing and biasing means component 31 of FIGURE 2. The tape transport means 14 of FIGURE 1 may comprise any of the tape transport means disclosed in said copending application Ser. No. 401,832. The transducer heads such as represented generally at 24 and more specifically at 30 in FIGURES 1 through 6 may comprise any of the transducer head configurations illustrated in my copending application Ser. No. 401,832 filed Oct. 6, 1964, my copending application Ser. No. 407,402 filed Oct. 29, 1946 or my copending application Ser. No. 439,-340 filed Mar. 12, 1965.

The dash lines such as indicated at 304 represent a mechanical coupling with the indicated part such as means for driving the part, braking or shifting the part, selectively, in accordance with conventional practice or as disclosed in my copending application Ser. No. 401,832.

A head swiveling means component 310 in FIGURE 1 is for the purpose of swiveling the head assembly 24 about a pivot axis such as indicated at 311 in order to bring the pole tips 30 into contact with a suitable head cleaner brush assembly 312 which at the same time may be rotated on a central axis by means of head cleaner drive component 314. The operation of the components 310 and 314 may be initiated manually at the option of an operator, or automatic operation of these components may be initiated each time the head is indexed between successive channels or the like. By way of example, the head indexing and biasing means 31 may include the head swiveling means component 31 so that the head assembly 24 is swiveled about pivot axis 31 during indexing by the component 31 between successive channels on the record medium. Alternatively, the head swiveling means may comprise a lever arm such as indicated at 88 in FIGURE 8 which carries the head indexing and biasing means as illustrated in FIGURES 7–9.

Referring to FIGURE 2, the capstan assembly 18 may comprise a cylindrical member 320 of non-magnetic material such as brass which is integral with the capstan flywheel generally as indicated in FIGURE 9 and a shell member 321 of magnetically soft material such as "Mumetal" fixed to the outer surface of the member 320. Annular grooves such as indicated at **321*a* are provided in the surface of the keeper shell 321 which receives the inactive surface of the record medium 15. The width of the grooves at the surface of the shell member 321 is greater than the corresponding transverse dimension of the pole pieces 30 as illustrated in more detail with respect to the embodiment of FIGURE 9. The annular grooves are aligned with the respective channels on the record medium 15 and are thus aligned with the respective positions of the pole pieces 30 in scanning relation to the respective channels. Because the tape record medium 15 is preferably relatively thin, the keeper shell 321 will have a substantial effect in diverting magnetic flux from the inactive channels away from the magnetic head assembly 24 which is associated with the active channel being scanned. The head indexing and biasing means component 31** and the relationship of the head to the capstan assembly may substantially correspond to that described in connection with the embodiment of FIGURES 7–9.

Referring to the embodiment of FIGURE 4, while preferably the rings 39 protrude somewhat from the cylindrical surface defined by the rings 37, as an alternative, the rings 39 may have their external faces flush with the exterior cylindrical faces of the rings 37 and still provide a backing to the record medium where engaged by the pole pieces 30 as illustrated in FIGURE 4.

Referring to FIGURE 6, the head biasing component 63 may include swiveling means for rotating the head assembly 24 about a central axis so as to bring the pole pieces of the head assembly into contact with a rotary brush assembly 330 driven by means of a suitable motor indicated at 331. In this embodiment, the head bias may be released and the head swiveled into operative relation to the brush assembly 30 prior to each indexing of the tape guide means by the guide shifting means 72. After a new channel of the record medium has been registered with the head assembly, the head assembly may be swiveled back into the scanning position and the head biasing means activated to press the pole pieces 30 into scanning relation to the active channel on the record medium. As in the other embodiments, components 63 and 331 may be activated automatically in sequence in relation to the guide shifting means 72, or the components may be activated manually at the option of the operator.

Referring to the embodiment of FIGURES 7–9, in the illustrated embodiment the head assembly 75 is secured to the arm 88 for pivotal movement about the pin 126, FIGURE 8. The portions **88*a* and 88*b* on the arm 88 may project through a slot 340 in the panel 79 which is shaped to permit the pivotal movement of the arm about the pivot point 126. The bracket 341 mounting the adjustment screw 127′ may be fixed to the panel 79. The part 342 bottoming the compression spring 125 may also be secured to the panel 79**.

Referring to FIGURES 7 and 8, a head cleaner assembly is indicated generally at 345 including a brush element 346 which is adapted to be driven by an electric motor 347, FIGURE 9. A switch is indicated at 348 which may be manually or automatically operated when it is desired to carry out a head cleaning operation. The motor 347 and brush 346 are carried on a shiftable plate 350 which is guided by means of a pair of shouldered screws 353 extending through an elongated slot 355 in the plate 350. A post is indicated at 356 which may be secured to the panel 79 and may receive the screw 353. The post may have a flat rectangular upper face on which the plate 350 slides. The plate 350 may be manually actuated by means of a suitable handle or tab fixed thereto so as to move the brush 346 into operative relation to the pole pieces of the transducer head 85.

The plate 350 may be provided with a cam edge **350*a* which coacts with an extension 360 on the bracket 78 to swing the head assembly 75 about the pivot point 126 as the brush 346 is moved toward the transducer head 85. The head 85 is thus automatically retracted from the record medium 15 as the brush 346** moves into contact therewith.

The contact arm 127 may cooperate with an extended surface contact 362 over which the contact arm 127 slides so that the contact 127 accommodates the extended pivotal movement of the arm 88 during the cleaning operation, but is also closed in response to the slight pivotal action produced by rotation of the cam 90.

The guide posts or rollers 364 and 365 in FIGURE 7 have the same function as the guide posts 301 and 302 in FIGURE 1.

Referring to FIGURE 8, the contactor 122 may be operated automatically by an electrically conductive tab on the tape, or by the transducer head sensing a special control signal recorded on the tape, or by means for sensing a special leader attached to the tape ends, or the like.

The tape transport means may conform with any of the various possibilities described with respect to FIGURE 1.

Where desirable to conveniently accommodate gearing, the capstan 74 may be provided with an annular groove as indicated at 370 in FIGURE 9 and as indicated by the dash line 370 in FIGURE 8.

The tape transport may be of the endless loop type as disclosed in my U.S. Patent No. 2,857,164 issued Oct. 21, 1958, in which case it is not necessary to reverse the direction of tape movement at the end of each successive channel.

FIGURE 8 illustrates a system whereby the captsan 74 may be operated at a relatively low audio transducing speed as well as the video transducing speed. By way of example, the video transducing speed may be of the order of 100 inches per second while the audio transducing speed may be less than 10 inches per second. During video speed operation the motor 98 indicated diagrammatically in FIGURE 8 is driven from a suitable alternating current source connected to terminals 381 and 382. By way of example the terminals 381 and 382 may be connected to a commercial power line having a frequency of 60 cycles per second. In the video mode, the direction of rotation of the motor 98 is controlled by a reversing switch 384, contact arm 385 is in its left hand position and contact arm 386 is in open position.

To condition the transport mechanism for audio speed operation, an audio button 390 is depressed to place the components in the position shown in FIGURE 8, that is with the switch arm 385 in its upper position and switch arm 386 in closed position. Further in the audio mode, an auxiliary flywheel 392 is released so as to allow a tension spring 393 to hold a drive pulley 395 in driven engagement with the periphery of the flywheel 96. The inertia of the auxiliary flywheel 392 is selected to provide stable movement of the record medium at the audio transducing speed. It will be apparent that the auxiliary flywheel 392 will be driven at a relatively high speed because of the small diameter of the wheel 395 in comparison with the diameter of the capstan flywheel 96. A frame 397 rotatably carrying the auxiliary flywheel 392 and the wheel 395 is shown pivotally mounted on an axis 398. Release of the pushbutton 390 causes the flywheel assembly to pivot about the axis 398 and out of driven relation to the capstan flywheel 96 against the action of the tension spring 393. In the audio transducing mode, switch contact 386 adds a capacitor 400 in parallel with the capacitor 402 so as to provide the proper phase shift for the relatively low output from the low frequency oscillator component 405 which drives the motor 98 at the audio speed. The reversing switch 384 is operated to reverse the direction of rotation of the motor 98 in the audio mode as well as in the video mode.

The terminals 410 and 411 in FIGURE 8 may be connected to a suitable source of direct current which is capable of driving the motor 117 in respective opposite directions in accordance with the condition of the reversing switch contacts 118 and 119. The motor 117 may comprise a small permanent magnet motor which reverses upon reversal of the polarity of the applied voltage.

Since the switches 121, 127, 128 and 122 are all in parallel, one or more of the switches may be eliminated by having its described function performed by the remaining switches. A further switch is indicated at 412 for disabling the head indexing mechanism when desired.

In preferance to the utilization of capacitors 401 and 402 in the audio mode, the low frequency oscillator component 405 may provide a two phase output suitable for driving the motor 98 If required, the capacitor 402 could be switched out of the circuit during the audio mode of operation.

Referring to FIGURE 11, the element 161 may be either a potentiometer or a variable transformer. The lines $L_1$, $L_2$ in FIGURES 10 and 11 may be connected to an alternating current source, for example 60 cycle per second sinusoidal current, and the coils 27 and 28 on core 26 are proportioned to give a magnetic field at the tape sufficient to erase it, 500 to 2000 oersteds or more being required for the usual tapes.

In FIGURE 10 a suitable small motor is indicated at 420 for selectively driving a head cleaning brush 422 during head demagnetizing operation. A head demagnetizing button is indicated at 424 which when depressed closes a contact 425 in the energizing circuit for motor 420. A further contact 428 controlled by button 424 controls supply of energy to an auxiliary motor 430 which may be suitably mechanically coupled to the reel shaft 432 by means of a mechanical coupling indicated at 433. An electromagnetic clutch or the like may be provided for disengaging the motor 430 from the shaft 432 when contact 428 is open.

A further contact 435 is shown controlled by button 424 so that when the demagnetizing operation is in process, a winding 437 on the core 26 is connected with a winding 439 on a magnetic transducer head 440. The electric current induced in winding 437 by the demagnetizing flux in the core 26 thus energizes the head winding 439 during the demagnetizing operation to demagnetize the core of the magnetic head 440. When button 424 is released, the winding 439 may be connected to the signal circuits of the apparatus by means of line 442 while winding 437 is disconnected from the winding 439. During a transducing operation the magnetic tape 15 travels along a path such as indicated at 443 between the confronting poles of the transducer head 440 and the brush element 442. The brush element 442 may be designed to serve as a pressure pad for holding the tape in stable coupling relation with the transducing head 440 during transducing operation.

In FIGURE 10, one end of the bimetallic element 148 is shown affixed to a stationary part 445. The latch bar 154 is shown as having rectangular apertures such as 447 so that as the button 143 or 146 is depressed a wedge shaped lug such as 448 will force the latching bar 154 in the direction of arrow 155. The size of the apertures 447 is such as to allow the entire lug 448 to pass through the aperture, whereupon the latching bar 154 is retracted to the position shown in FIGURE 10 by means of the compression spring 158 to latch the button or buttons in the operating position. Suitable spring means acting on the button or buttons will return the buttons to the inactive position shown in FIGURE 10 when the crank 152 is rotated in the counterclockwise direction by means of the rod 150.

It will, of course, be understood that there is a suitable pivotal connection between the bar 154 and the crank 152 at the region indicated by the reference numeral 450.

In FIGURE 10, a panel 452 has been indicated between the demagnetizing assembly 25 and the reel 12 and it will be understood that this panel may be of a suitable nonmagnetic, non-conductive material such as linen Bakelite.

Referring to FIGURE 11, components such as 422, 430, 437, 439 and 452 may be provided as in FIGURE 10.

The slide bars such as 170–173 may be coupled to suitable actuating buttons and may be latched by a latching bar similar to the bar 154 in FIGURE 10. The slide bar 170 is shown in an actuated condition with its notch **170*a* in alignment with the flange 168*a* of body 168. Bars 171 and 172 may be considered as shown in a deactuated condition with their respective notches 171*a* and 172*a* out of alignment with the flange 168*a*. With each of the slide bars 170–172 in an actuated condition, slide bar 173 may be actuated to allow pivoting of the body 168 about the axis 169. The link 164 may be considered as fixed to the body portion 168 at the region 460. The slide bar 173 may be incapable of being latched and may be automatically returned by means of spring 175 when released. By way of example, slide bar 170 may be in the deactuated condition shown in FIGURE 11 when the apparatus is in a stand-by condition with the audio and video outputs short circuited. The slide bar 171 may be associated with a record-play selector button and may be in the position shown when actuated to the play mode. The slide bar 172** may control the drive-stop function and is shown in the forward drive condition in FIGURE 11. Thus, the demagnetizing operation could only be carried out when the buttons were in condition for stand-by, record, and stop conditions. Of course, these slide bars may represent other preconditions to the demagnetizing operation as desired.

The audio mode button 390, the slide bars 170-172 and the audio mode button 190 in FIGURE 12 may all be provided with a conventional type of latching means such as illustrated by the latch bar 154 and lugs 448 in FIGURE 10. In such pushbutton arrangements, depressing of one button will generally release the others by actuation of the latching bar such as 154. Thus the audio mode button 190 might be released by depressing a stop button or the like.

The systems which have the transducing action take place while the head is against the portion of the tape traveling over the capstan allow very steady tape to head contact and very steady tape motion needed for critical video application. The indexing system prevents the possibility of head injury since the head may be retracted or pivoted in the plane of capstan grooves or the like before being shifted to the next channel position. The head indexing mechanism or tape indexing mechanism may be activated automatically or manually. An audio speed drive in conjunction with the video drive enables the mechanism to be utilized alternatively for these two functions. It is particularly advantageous when the same motor and capstan assembly can be utilized in the audio transducing mode and the video transducing mode since this leads to a particularly economical and simple yet highly versatile machine.

In each of the embodiments, it may be assumed that the head is of the ring type with the poles spaced in the direction of tape travel to provide longitudinal type recording fields. The metal parts of the capstan engaging the surface may be of rigid material to provide a precise cylindrical tape engaging surface determining the tape path about the capstan.

It will be apparent that the features of each embodiment may generally be applied to the other embodiments and such obvious modifications of the respective embodiments should be considered as specifically disclosed herein.

The disclosures of my copending applications Ser. No. 344,075 filed Feb. 11, 1964, Ser. No. 389,021 filed Aug. 12, 1964, Ser. No. 393,282 filed Aug. 31, 1964, Ser. No. 401,832 filed Oct. 6, 1964, Ser. No. 407,402 filed Oct. 29, 1964 and Ser. No. 439,340 filed Mar. 12, 1965 are specifically incorporated herein by reference as giving further information concerning video recording of broadcast television signals and the like and as suggesting various modifications of the embodiments specifically shown and described herein.

By way of illustration of a modification of FIGURE 12, a single reversible capstan motor may be utilized with a two phase transistor low frequency oscillator driving the capstan motor at audio speed and a commercial power source at 60 cycles per second, for example, by driving the motor at the video transducing speed. The audio button 190 in FIGURE 12 may serve to couple an auxiliary flywheel such as indicated at 392 to the capstan flywheel which is used alone during video transducing operation. As in FIGURE 8, the auxiliary flywheel can be driven at relatively high speed in comparison with the capstan flywheel 212 to provide the desired angular momentum during audio transducing operation. One or more of the amplifier stages of the video circuit 181 may be utilized in transducing audio signals instead of utilization of separate audio circuitry.

Referring to FIGURES 10 and 11, the windings 27 and 28 may be on a video transducer head for demagnetizing the head, rather than being associated with a core 26 for demagnetizing the tape.

By way of example where the low frequency oscillator component 405 provides a frequency of 3.75 cycles per second corresponding to a tape speed 7.5 inches per second, for example, capacitor 402 may have a value of 3.75 microfarads and capacitor 401 may have a value 35 microfarads. As previously described, however, a two phase low frequency oscillator component is preferred.

Referring to FIGURE 10, the motor 430 may be utilized to rotate the reel 12 prior to threading of the tape record medium in the machine, for example. Where an automatic threading machine such as illustrated in my application Ser. No. 124,683 filed July 17, 1961 is utilized, the demagnetizing operation may take place simultaneously with the automatic threading operation where a new recording is to be placed on the tape.

Referring to FIGURE 8 the drive pulley 395 has a friction surface of material such as rubber. It will be understood that depending upon the characteristics of the video drive system and the desired audio reproducing characteristics, the flywheel 392 may be omitted, so that the showing in FIGURE 8 should not be construed as requiring the auxiliary flywheel 392 in all cases in the audio mode. It will be understood that in the embodiment of FIGURE 8, in the high speed video mode, both the audio and video components of a broadcast video signal, for example, may be recorded by any of the methods disclosed in my aforementioned copending applications Ser. Nos. 344,075, 389,021, 393,282, 401,832, 407,402, and 439,340. The low speed mode of operation may provide recording of an audio channel only, using a different audio system adapted for the low speed such as a longitudinal ring type core magnetic transducer head, the high speed audio recording head being unsuitable at the slower speed.

It is desirable that the head demagnetizing operation such as illustrated in FIGURE 10 or FIGURE 11 take place simultaneously with the head pole surface brushing operation. These operations may be effected periodically in an automatic manner. For this purpose an arrangement such as shown in FIGURE 10 may be used if a step down transformer is substituted for the primary windings 27, 28, the secondary winding 437 and the core 26 in FIGURE 10, so that the head 440 can be demagnetized without requiring erasure of the reel of tape. Further, head demagnetization may be initiated automatically upon swiveling of the head 24 in FIGURE 1 to a position out of coupling relation to the record medium or upon bringing the brush 346 in FIGURE 7 into operation. These actions may also automatically actuate switches which energize the head cleaner drive component 314, FIGURE 1, or the brush motor 347, FIGURE 9, for example, and also initiate operation of the head demagnetizing operation where the head demagnetizing winding such as indicated at 439 is energized separately from the bulk erase core 26 as just described. Since in the embodiments of FIGURES 1 and 10, the head 24 or 440 is out of contact with the tape, it can be demagnetized without harm to the recorded tracks on the record medium.

Referring to FIGURE 10, the winding 439 may be mounted separate from the head core 440 rather than physically encircling the core as shown in FIGURE 10, with the demagnetizing winding such as 439 coupled closely enough to the head core to demagnetize it when energized with the system of FIGURE 10 or with the use of a separate step down transformer as just described.

In FIGURE 1, the tape transport means 14 may drive each of the reel spindles in its winding direction through a slipping drive (either in the motor itself or in the coupling between the motor and the reels 12 and 13) in each direction of operation of the capstan 18, so that the spindle acting as the supply spindle is resisting the unwinding of the tape from the reel thereon. In this way the direction of energization of the capstan 18 determines the direction of movement of the tape, and the tape is maintained taut between the supply reel and the capstan. The slipping drives tend to wind the tape on the reels 12 and 13 at a faster rate than permitted by the capstan 18, so that in either direction of operation the tape is also taut between the capstan and the take-up reel.

Referring to FIGURES 7 to 9, the switch 348, FIGURE 9, may be automatically closed in response to energization of motor 117 to drive the head between channels on the tape. Further the motor 117 may automatically move the head cleaner assembly 345 into operative relation to the tape engaging surface of the head 85 each time the head is indexed between channels and then retract the head cleaner assembly again. In this case, the brush drive motor 347 is energized and the brush 346 engaged with the head periodically during a normal tape scanning operation of the system; specifically the head cleaning operation may take place automatically each time the head is indexed to a new channel by energization of motor 117.

Similarly a head demagnetizing winding coupledto head 85 may be energized each time the head is retracted from the capstan 74 by means of cam 90. For example a switch controlling a head demagnetizing device such as shown at 139 in FIGURE 10 may be actuated each time the cam 90 has rotated a given amount from the position shown in FIGURE 8. The arm 136 in FIGURE 10 may be driven with cam 90 from gear 115 by means of motor 117 so that the demagnetizing cycle is always completed before the head returns into engagement with the tape. The head would be retracted far enough by cam 90 so that the demagnetizing field could not affect the tape.

Thus the head cleaning and head demagnetizing operations may take place simultaneously each time the head is indexed to a new channel by energization of motor 117.

In FIGURE 8, as a preferred embodiment, the drawings may be considered as illustrating a two phase low frequency oscillator 405 with switch means for directly connecting the two phase output to motor 98 and for selectively driving the motor 98 in respective opposite directions in accordance with the position of lever 103. Direct coupling to the motor windings is preferred to reduce bulk and expense of transformer or capacitor elements.

Referring to FIGURE 12, a wide band amplifier component 470 may be connected in series with head 180 for use in recording and playback of video signals in the position of switch contact 182 shown, and for use in recording and playback of audio signals in the upper position of switch contact 182. The amplifier component preferably utilizes the principles taught in my copending application Ser. No. 401,832 and may include suitable switch means for selectively connecting the head 180 to the input or output thereof and for switching in any specialized recording or playback networks as may be desired.

Component 181 may represent auxiliary recording and playback video circuitry in addition to that provided by component 470. Similarly audio circuit 192 may include any further recording or playback circuitry which may be desired as well as suitable record-play switching means.

Since amplifier 470 preferably has a wide band response suitable for vedio signals, the response of the amplifier is adequate for audio frequency signals as well. Component 470 may also supply suitable recording bias currents to winding 471, or to special bias windings such as disclosed in my copending applictions Ser. No. 401,832 and 407,402.

It will be apparent that many modifications and variations may be effected without departing from the scope of the novel concepts of the present invention.

I claim as my invention:

1. A transducer system comprising
a capstan having a capstan flywheel fixed thereto,
means for driving said capstan selectively at a video transducing speed and at an audio transducing speed,
an auxiliary flywheel, and
means for driving said auxiliary flywheel from said capstan flywheel with a substantial step up in speed during drive of the capstan at said audio transducing speed.

2. A transducing system comprising
a record medium transport apparatus operable in an audio mode to move a record medium at an audio transducing speed and operable in a video mode to move a record medium at a video transducing speed,
said apparatus comprising an auxiliary motor and speed reduction coupling for driving the record medium at the audio transducing speed,
a capstan driven from said auxiliary motor and speed reduction coupling in the audio mode,
a high speed driving motor having a rotor and a rotor output shaft, and having said capstan directly on said rotor output shaft, and
means for energizing said high speed driving motor for driving said capstan in the video mode.

3. A transducing system comprising
a record medium transport apparatus operable in an audio mode to move a record medium at an audio transducing speed and operable in a video mode to move a record medium at a video transducing speed,
said apparatus being energized at normal power line frequency in the video mode, and
a low frequency local oscillator operating at a frequency substantially below said power line frequency for energizing said apparatus in the audio mode.

4. A transducing system comprising
a record medium transport apparatus operable in an audio mode to move a record medium at an audio transducing speed and operable in a video mode to move a record medium at a video transducing speed,
said apparatus being energized at normal power line frequency in the video mode, and
a low frequency local oscillator operating at a frequency substantially below said power line frequency for energizing said apparatus in the audio mode,
a motor operable in both the audio and video modes,
said local oscillator being a polyphase oscillator and supplying polyphase power to said motor in the audio mode.

5. A transducing system comprising
a record medium transport apparatus operable in an audio mode to move a record medium at an audio transducing speed and operable in a video mode to move a record medium at a video transducing speed,
said apparatus being energized at normal power line frequency in the video mode, and
a low frequency local oscillator operating at a frequency substantially below said power line frequency for energizing said apparatus in the audio mode,
an electric circuit having a video condition and an audio condition, and
switch means for shifting said apparatus between a power line and said local oscillator and for shifting said electric circuit between its video condition and its audio condition.

6. A transducer system for selective transducing of audio intelligence or video intelligence comprising
a longitudinal scan transducer head having a pair of poles defining a longitudinal scanning gap,
means defining a transducing path for a magnetic tape record medium extending successively across said poles,
video circuit means for supplying a substantially continuous video signal to said transducer head for recording thereof along a single track of the tape record medium scanned by the scanning gap of the transducer head,
audio circuit means for supplying a substantially continuous audio signal to said transducer head for recording thereof along the single track of the tape record medium scanned by the scanning gap of the transducer head,
switching means for selectively connecting said video circuit means and said audio circuit means to said transducer head for recording of either the substantially continuous video signal or the substantially continuous audio signal along the length of the single track of the tape record medium, and
tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with said transducer head, and for driving said capstan at a relatively low transducing speed when said switching means connects said audio circuit means to said transducer head.

7. A transducer system for selective transducing of audio intelligence or video intelligence comprising
a longitudinal scan transducer head having a pair of poles defining a longitudinal scanning gap,
means defining a transducing path for a magnetic tape record medium extending successively across said poles,
video circuit means for supplying a substantially continuous video signal to said transducer head for recording thereof along a single track of the tape record medium scanned by the scanning gap of the transducer head, audio circuit means for supplying a substantially continuous audio signal to said transducer head for recording thereof along the single track of the tape record medium scanned by the scanning gap of the transducer head, switching means for selectively connecting said video circuit means and said audio circuit means to said transducer head for recording of either the substantially continuous video signal or the substantially continuous audio signal along the length of the single track of the tape record medium, and tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with said transducer head, and for driving said capstan at a relatively low transducing speed when said switching means connects said audio circuit means to said transducer head, and said video circuit means and said audio circuit means including a common single amplifier connected with said transducer head in both conditions of said switching means for amplifying the continuous video signal when the video circuit means is connected to the transducer head and for amplifying the substantially continuous audio signal when the audio circuit means is connected to said transducer head.

8. A transducer system for selective transducing audio intelligence or video intelligence comprising a longitudinal scan transducer head having a pair of poles defining a longitudinal scanning gap, means defining a transducing path for a magnetic tape record medium extending successively across said poles, video circuit means for supplying a substantially continuous video signal to said transducer head for recording thereof along a single track of the tape record medium scanned by the scanning gap of the transducer head, audio circuit means for supplying a substantially continuous audio signal to said transducer head for recording thereof along the single track of the tape record medium scanned by the scanning gap of the transducer head, switching means for selectively connecting said video circuit means and said audio circuit means to said transducer head for recording of either the substantially continuous video signal or the substantially continuous audio signal along the length of the single track of the tape record medium, and tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with said transducer head, and for driving said capstan at a relatively low transducing speed when said switching means connects said audio circuit means to said transducer head, said capstan having a capstan flywheel rotatable coaxially therewith and operable for stabilizing rotation of said capstan at said relatively high speed, and an auxiliary flywheel having driving means therefor directly engageable with the periphery of the capstan flywheel for driving said auxiliary flywheel with a substantial step up in speed during drive of the capstan at said relatively low transducing speed.

9. A transducer system for selective transducing of audio intelligence or video intelligence comprising a longitudinal scan transducer head having a pair of poles defining a longitudinal scanning gap, means defining a transducing path for a magnetic tape record medium extending successively across said poles, video circuit means for supplying a substantially continuous video signal to said transducer head for recording thereof along a single track of the tape record medium scanned by the scanning gap of the transducer head, audio circuit means for supplying a substantially continuous audio signal to said transducer head for recording thereof along the single track of the tape record medium scanned by the scanning gap of the transducer head, switching means for selectively connecting said video circuit means and said audio circuit means to said transducer head for recording of either the substantially continuous video signal or the substantially continuous audio signal along the length of the single track of the tape record medium, and tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with said transducer head, and for driving said capstan at a relatively low transducing speed when said switching means connects said audio circuit means to said transducer head, said tape transport means comprising a high speed capstan motor directly coupled with said capstan for driving said capstan at said relatively high transducing speed, said capstan having a capstan flywheel rotatable coaxially therewith, and an auxiliary motor and speed reduction coupling engageable with the periphery of said capstan flywheel for driving said capstan at said relatively low transducing speed.

10. A transducer system for selective transducing of audio intelligence or video intelligence comprising a longitudinal scan transducer head having a pair of poles defining a longitudinal scanning gap, means defining a transducing path for a magnetic tape record medium extending successively across said poles, video circuit means for supplying a substantially continuous video signal to said transducer head for recording thereof along a single track of the tape record medium scanned by the scanning gap of the transducer head, audio circuit means for supplying a substantially continuous audio signal to said transducer head for recording thereof along the single track of the tape record medium scanned by the scanning gap of the transducer head, switching means for selectively connecting said video circuit means and said audio circuit means to said transducer head for recording of either the substantially continuous video signal or the substantially continuous audio signal along the length of the single track of the tape record medium, and tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with said transducer head, and for driving said capstan at a relatively low transducing speed when said switching means connects said audio circuit means to said transducer head, said tape transport means including a capstan motor for driving said capstan at said relatively high transducing speed when energized at normal power line frequency, and a relatively low frequency local oscillator operating at a frequency substantially below said power line frequency for energizing said motor to drive said capstan at said relatively low transducing speed.

11. A transducer system for selective transducing of audio intelligence or video intelligence comprising a longitudinal scan transducer head having a pair of poles defining a longit udinal scanning gap, means defining a transducing path for a magnetic tape record medium extending successively across said poles, video circuit means for supplying a substantially continuous video signal to said transducer head for recording thereof along a single track of the tape record medium scanned by the scanning gap of the transducer head, audio circuit means for supplying a substantially continuous audio signal to said transducer head for recording thereof along a single track of the tape record medium scanned by the scanning gap of the transducer head, switching means for selectively connecting said video circuit means and said audio circuit means to said transducer head for recording of either the substantially continuous video signal or the substantially continuous audio signal along the length of the single track of the tape record medium, and tape transport means including a capstan for driving contact with the tape record medium for moving the tape record medium along said transducing path and successively across the poles of the transducer head at a substantially constant speed, said tape transport means being operable to drive said capstan at a relatively high transducing speed when said switching means connects said video circuit means with seaid transducer head, and for driving said capstan at a relatively low transducing speed when said switching means connects said audio circuit means to said transducer head, said tape transport means comprising a relatively high speed motor for driving said capstan at said relatively high transducing speed, said capstan having a capstan flywheel coaxially therewith, and relatively low speed reversible drive means engageable with the periphery of said capstan flywheel for selectively driving said capstan in respective opposite directions at said relatively low speed for driving the tape record medium in either longitudinal direction along said transducing path with the audio circuit means connected to said transducer head, said relatively low speed reversible drive means being completely disengaged from the capstan flywheel during operation with the video circuit means connected to the transducer head.

References Cited

UNITED STATES PATENTS

| | | | |
|---|---|---|---|
| 2,051,799 | 8/1936 | Suomala | 274—9 |
| 2,573,011 | 10/1951 | Gruber | 274—9 |
| 2,686,845 | 8/1954 | Reed et al. | 179—100.2 |
| 3,110,764 | 11/1963 | Barry | 179—100.2 |

OTHER REFERENCES

Transistor Circuits for Magnetic Recording, by N. M. Haynes,© January 1964, Howard W. Sams & Co., Indianapolis, Ind., pp. 231–232.

BERNARD KONICK, *Primary Examiner.*

J. R. GOUDEAU, *Assistant Examiner.*

U.S. Cl. X.R.

178—6.6; 226—42, 61, 188; 274—4; 317—157.5; 318—103, 161